(12) United States Patent
Wehner et al.

(10) Patent No.: US 6,315,247 B1
(45) Date of Patent: Nov. 13, 2001

(54) SPACECRAFT WITH A MICRODYNAMIC NOISE-FREE HOLDING MECHANISM

(75) Inventors: Michael J. Wehner, Hawthorne; Keith V. Kroening, Redondo Beach; L. Dwight Gilger, Torrance, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/368,978

(22) Filed: Aug. 5, 1999

(51) Int. Cl.⁷ .................................................. B64G 1/10
(52) U.S. Cl. ............................................... 244/158 R
(58) Field of Search ............................... 244/158 R, 173; 228/191, 249

(56) References Cited

U.S. PATENT DOCUMENTS 3,984,652 * 10/1976 Graville ................................. 219/73
4,290,168 * 9/1981 Binge ................................. 244/173 X
5,996,940 * 12/1999 McVey et al. ................... 244/158 R
6,126,115 * 10/2000 Carrier et al. .................... 244/158 R

* cited by examiner

Primary Examiner—Robert P. Swiatek
(74) Attorney, Agent, or Firm—Connie M. Thousand

(57) ABSTRACT

A spacecraft having a movable structure which is held in a preselected location by a holding mechanism substantially free of microdynamic noise. The holding mechanism comprises two mechanical members in physical contact with each other and movable with respect to each other. The unintentional movement of the two mechanical members with respect to each other generates microdynamic noise. The two mechanical members are secured together to provide joinder of the two mechanical members when the movable structure is located in the preselected position to prevent long-term unintentional movement between the two mechanical members.

27 Claims, 12 Drawing Sheets

SPACECRAFT WITH A MICRODYNAMIC NOISE-FREE HOLDING MECHANISM

BACKGROUND OF THE INVENTION

The present invention relates generally to holding mechanisms and more particularly to a spacecraft having a mechanical holding mechanism which is substantially free of microdynamic noise.

Movable structures such as solar arrays, antennas, masts, sensors, and the like, are frequently used in spacecraft applications where large structures are required when the spacecraft is in orbit but a compact structure is required when launching the spacecraft. The movable structures are typically stowed during launch and are subsequently deployed at a preselected time after the spacecraft decouples from the launch vehicle. After deployment, the movable structures are each positioned to a preselected location by a positioning mechanism such as an actuator or a spring.

A separate mechanical latching mechanism, such as a mechanical clamp, is typically used to hold the movable structures in the preselected locations. Mechanical latching mechanisms typically have at least two mechanical surfaces which are in physical contact with each other, examples of which are the pin and jaws of a mechanical clamp. When these two mechanical surfaces move with respect to each other, microdynamic noise is generated, which in turn generates low levels of vibration in the movable structure. This microdynamic noise is generally at a micro-G level and is therefore not a concern for most spacecraft applications. However, for spacecraft applications which require an ultra-quiet dynamic environment, such as a spacecraft having a spaced-based interferometer, microdynamic noise can interfere with the mission of the spacecraft and can perturbate the data gathered by the spacecraft.

Methods have been suggested to combat microdynamic noise. One such method consists of isolating and highly damping the source of the microdynamic noise. However, this is difficult to accomplish in practice. Another method consists of removing moving parts, such as hinges, from the load path once the movable structure is positioned to the preselected location. This is also difficult to accomplish in practice. Yet another method applies large amounts of preload to the holding mechanism, such as latches, in attempts to prevent slippage which generates microdynamic noise. However, evidence exists that sufficient preloads cannot be applied to bearings or latches to remove all microdynamic noises. Lastly, a technique of maintaining the structures at a constant temperature within a narrow band of temperatures has been suggested so that the structures do not expand and contract and generate microdynamic noise. This is very difficult to accomplish in practice and requires precision heating or cooling of the structure which is expensive, requires additional equipment on the spacecraft and extracts a large weight penalty.

What is needed therefore is a method to reduce the microdynamic noise in a high precision spacecraft which has a movable structure in which the method is relatively simple to accomplish in practice and does not exact a large weight penalty.

SUMMARY OF THE INVENTION

The preceding and other shortcomings of the prior art are addressed and overcome by the present invention which provides, in a first aspect, a spacecraft having a movable structure which is held in a preselected location by a holding mechanism and securing means substantially free of microdynamic noise. The holding mechanism comprises two mechanical members which are in physical contact with each other and are movable with respect to each other. The movement of the two mechanical members with respect to each other generates microdynamic noise. The securing means provides joinder of the two mechanical members once the movable structure is located in the preselected location to prevent long-term unintentional movement between the two mechanical members.

In a second aspect, the present invention provides a method of decreasing microdynamic noise on a spacecraft which has a movable structure coupled to the spacecraft. The method comprises the steps of holding the movable structure in the preselected location with a holding mechanism comprising two mechanical members in physical contact with each other; and, securing the two mechanical members together to prevent unintentional movement of the two mechanical members with respect to each other.

BRIEF DESCRIPTION OF THE DRAWINGS

Reference is now made to the detailed description of the preferred embodiments illustrated in the accompanying drawings, in which;

FIG. 6b is an interference fringe pattern produced by the interferometer of FIG. 6a;

FIG. 8b is an end view of the holding mechanism of FIG. 8a;

FIG. 9b is a sectional view of section A—A of FIG. 9a;

DETAILED DESCRIPTION OF THE PREFERRED EMBODIMENTS

Figure 1:
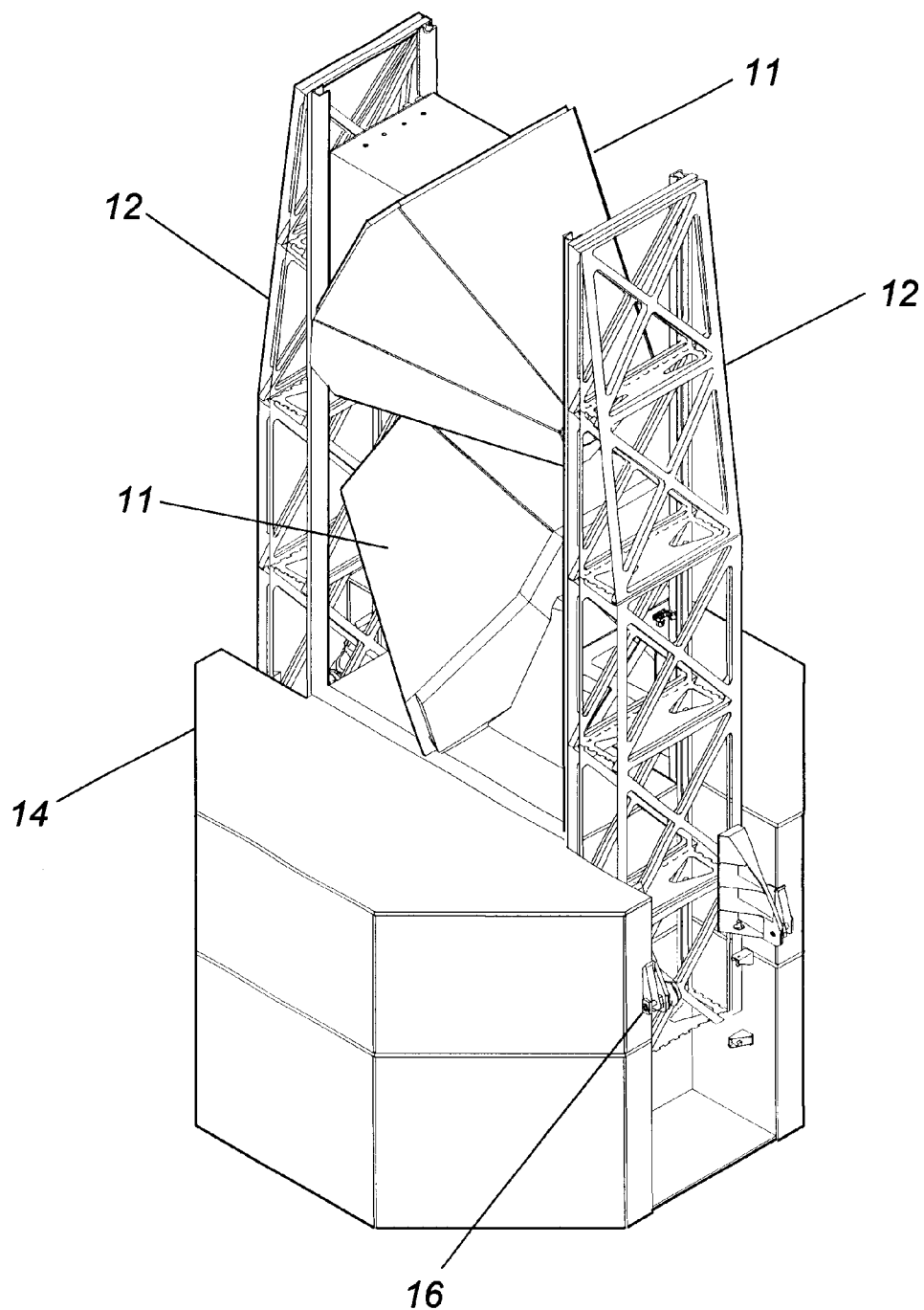
FIG. 1 is an isometric view of a spacecraft having a movable structure in a stowed position.
Figure 2:
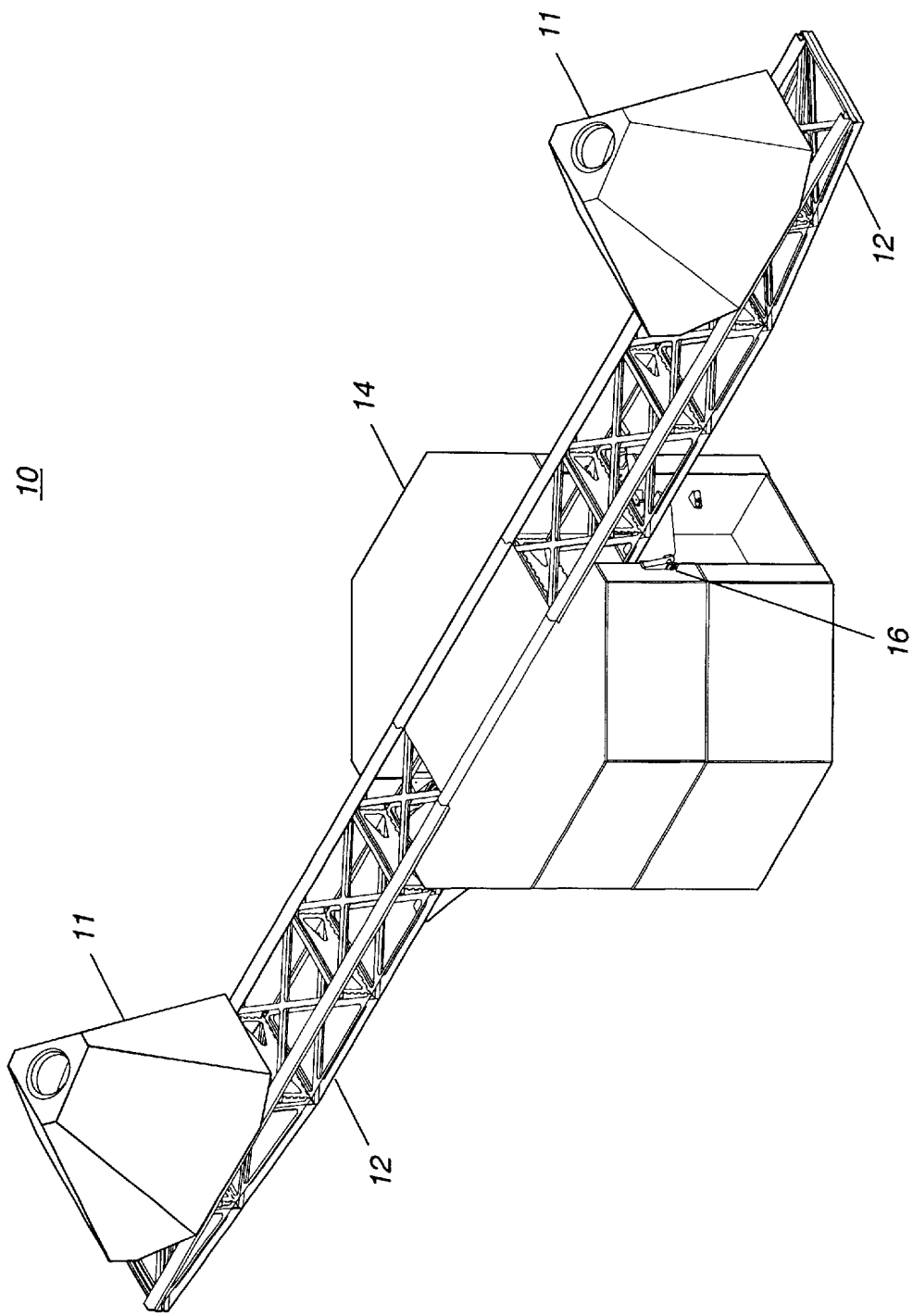
FIG. 2 is an isometric view of a spacecraft having a movable structure positioned in a preselected location.

FIGS. 1 & 2 shows a spacecraft 10 in which the present invention may be used. The spacecraft 10 is a high precision spacecraft 10 which requires an environment substantially free of noise. For the preferred embodiment of the invention, the spacecraft 10 includes a portion of a space-based instrument 11, such as gravity wave probes, interferometers, or any high fidelity electromagnetic sensing instrument, which requires micro-G levels of quiet. The spacecraft 10 includes at least one movable structure 12 which is coupled to the spacecraft body 14. The movable structure 12 can be a solar array, mast, boom assembly, antenna, or any other movable structure.

Figure 3:
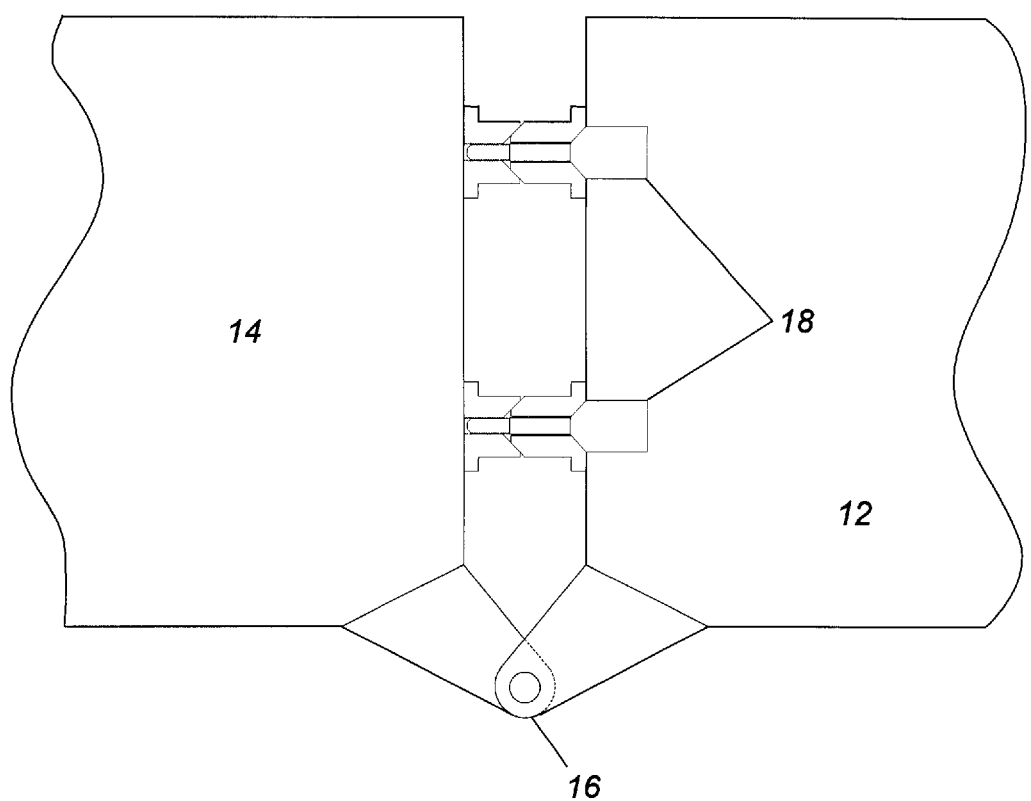
FIG. 3 is a side-plan view of a movable structure held in a preselected location by a holding mechanism in accordance with a first embodiment of the invention.

Positioning means 16 are provided for moving and positioning the movable structure 12 to a preselected location. The positioning means 16 can be a mechanical rotary joint, a hinge, an actuator, a spring, or any other mechanism known in the art to be operable to move and position a movable structure 12. Referring to FIG. 3, for a first embodiment of the invention, a holding mechanism 18 is provided for holding the movable structure 12 in the preselected location. The holding mechanism 18 can be a latch, clamp, fastener or any other mechanism known to one skilled in the art to hold a movable structure 12 in place.

Figure 4:
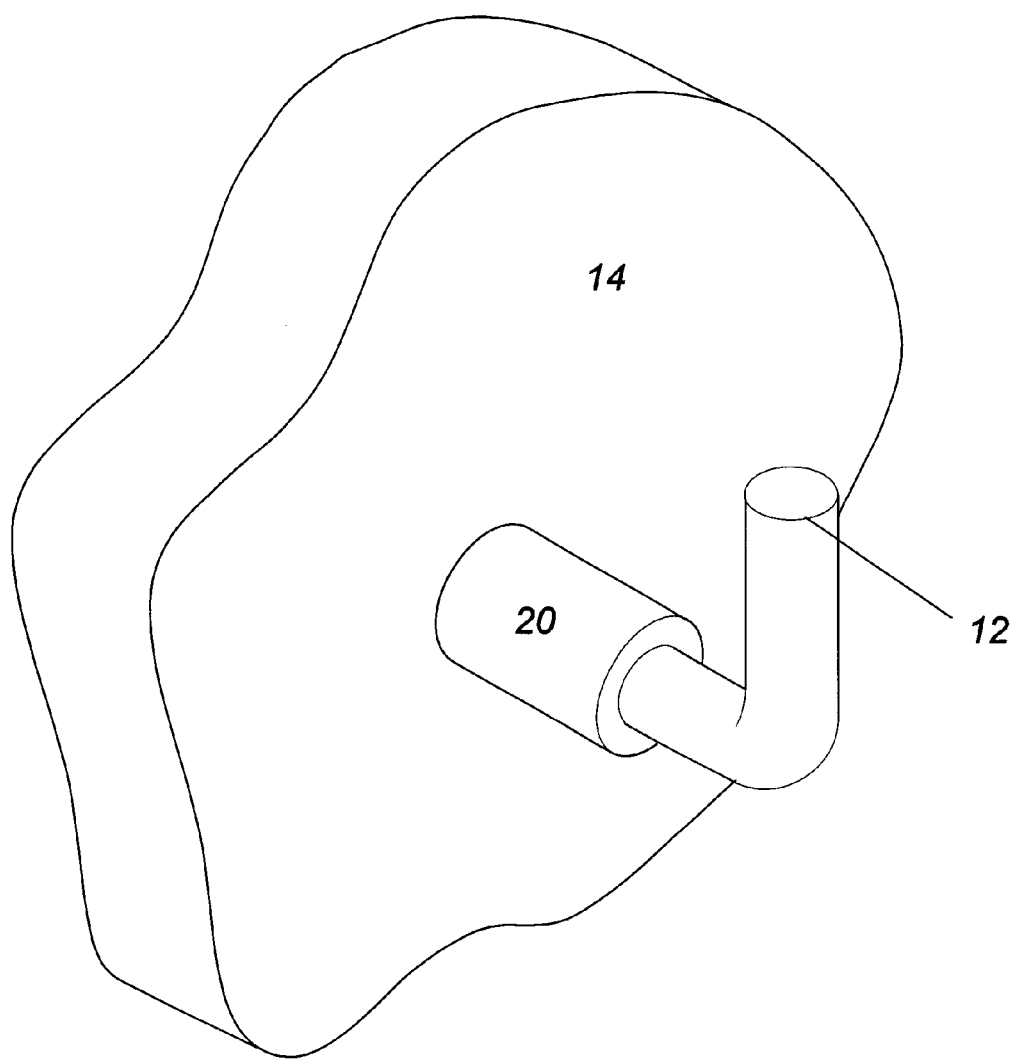
FIG. 4 is an isometric view of an actuator coupled to a movable structure in accordance with a second embodiment of the present invention.

For a second embodiment of the invention, the holding mechanism is formed integrally with the positioning means, an example of which is the mechanical actuator 20 shown in FIG. 4. Mechanical actuators such as the one shown in FIG. 4 are commonly used on space programs such as AXAF, DISCUS and SpaceTelescope and are manufactured by companies such as Shaeffer Magnetics of Chatsworth, Calif. and TRW of Redondo Beach, Calif. The mechanical actuator 20 is coupled to the movable structure 12 and the spacecraft body 14 and can provide for both the positioning and the holding of the movable structure 12.

Figure 5:
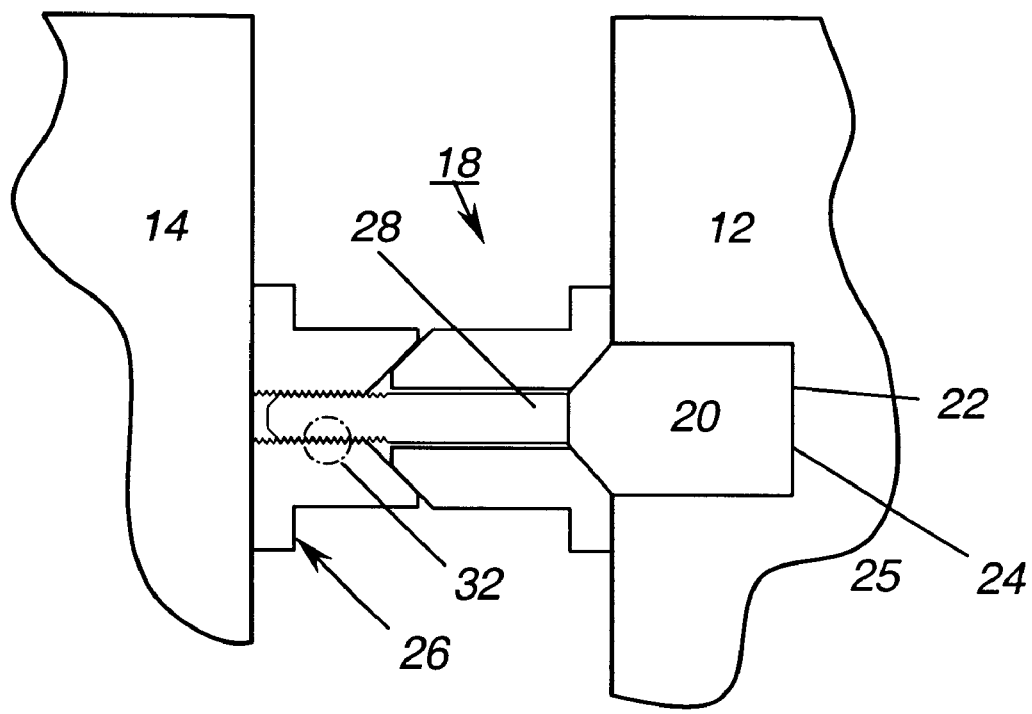
FIG. 5 is a side plan view of a holding mechanism in accordance with a third embodiment of the present invention.

Referring back to FIG. 3 and to FIG. 5, for a third embodiment of the invention, the holding mechanism 18 includes at least two mechanical members 26, 28 which are in physical contact with each other and are capable of moving with respect to each other. Examples of such mechanical members include the arm and pivot of a mechanical clamp, the ball joint and housing of a rotating joint, the male and female portions of a latch, and the ball bearings and rotating faceplate of an actuator 20 (FIG. 5). Since the mechanical members 26, 28 (FIG. 5) are in physical contact with each other, any movement of either mechanical member 26, 28 generates noise. Even after the mechanical members 26, 28 are positioned to hold the movable structure 12, the mechanical members 26, 28 still experience some movement with respect to each other due to environmental and time dependant conditions, such as thermal cycling and settling. This unintentional movement generates microdynamic noise which typically occurs at an unpredictable time such that the microdynamic noise is generated at an unpredictable time.

Figure 6A:
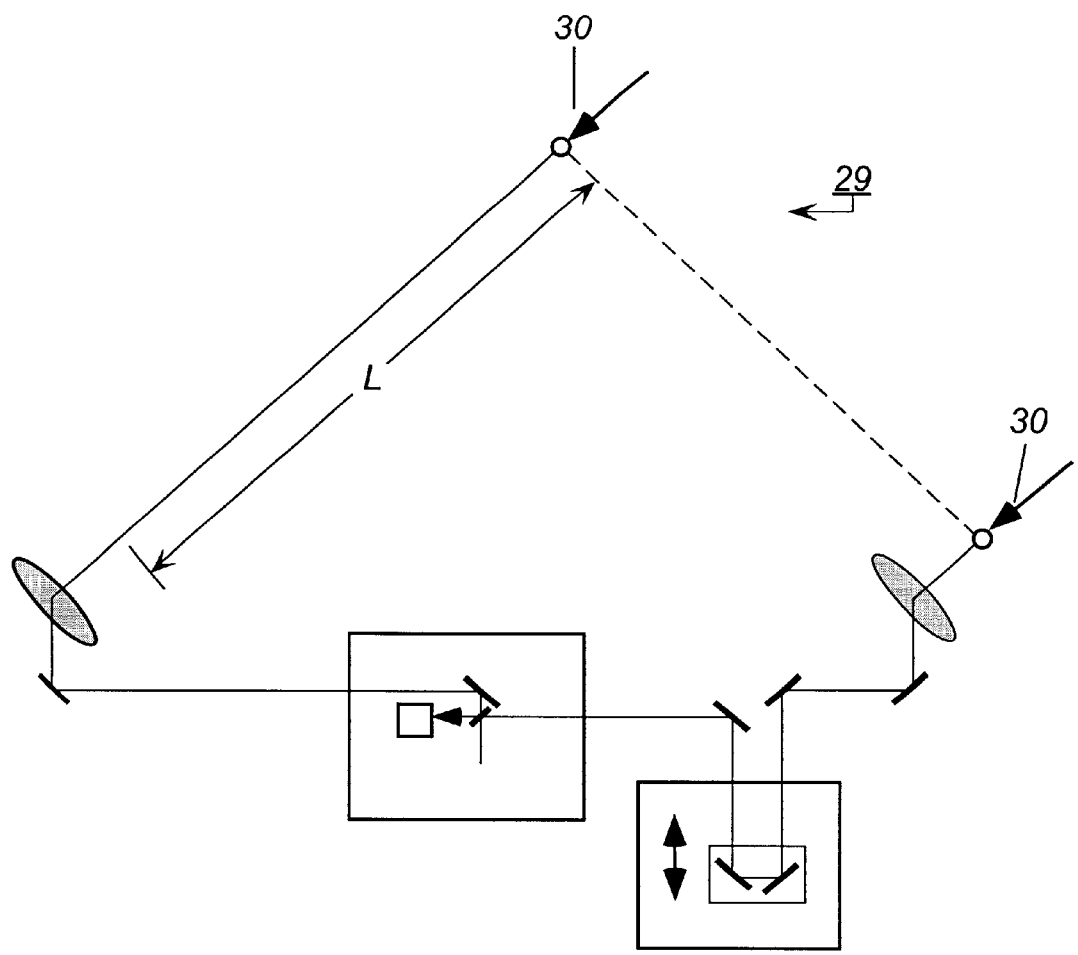
FIG. 6a is a schematic drawing of an interferometer.
Figure 6B:
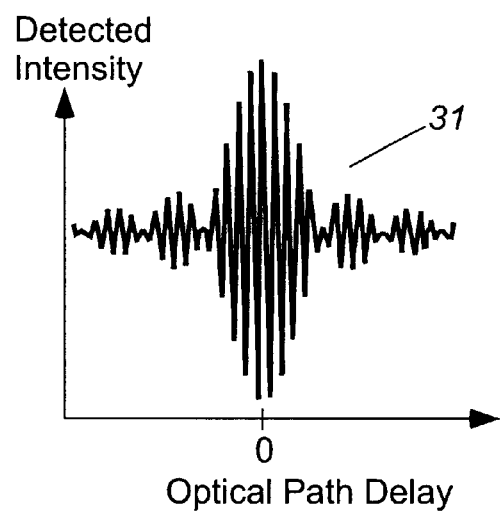

The microdynamic noise generated by the unintentional movement of the two mechanical members 26, 28 causes a significant problem with a spacecraft 10 (FIG. 2) having high fidelity electromagnetic sensing instruments such as an interferometer 29 shown in FIG. 6a. The interferometer 29 collects light pulses 30 and produces therefrom an interference fringe pattern 31. To provide for high precision results, the interferometer 29 must very accurately count the light pulses. Microdynamic noise can create measurement problems for the interferometer 29. In particular, the microdynamic noise created by the unintentional movement of the two mechanical members 26, 28 (FIG. 5) of the holding mechanism 18 can generate a pulse which may be counted by the interferometer 29 (FIG. 6a) and result in the creation of an incorrect interference fringe pattern 31 (FIG. 6b). Since the occurrence of this type of microdynamic noise is typically unpredictable, a user will typically not be able to discern an interference fringe pattern 31 which is free of microdynamic noise from one which includes microdynamic noise.

Figure 7:
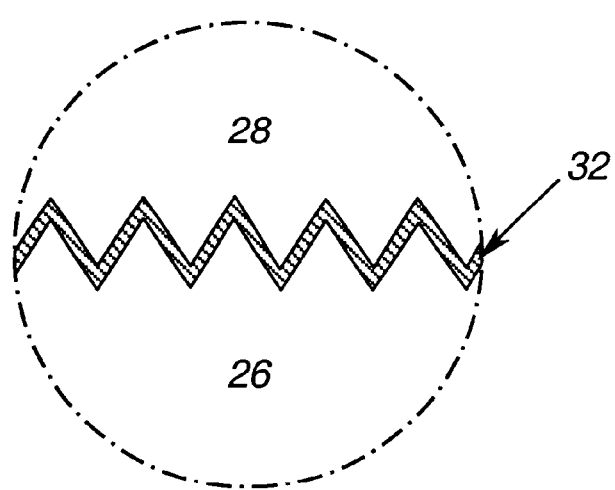
FIG. 7 is an expanded view of a portion of the holding mechanism of FIG. 5.

Referring back to FIG. 5 and to FIG. 7, securing means 32 are provided to reduce the microdynamic noise which is generated by the unintentional, unpredictable movement of the two mechanical members 26, 28 of the holding mechanism 18. The securing means 32 are applied to the holding mechanism 18 and provide joinder of the two mechanical members 26, 28. The securing means 32 are operative to prevent unintentional long-term movement of the mechanical members 26, 28 with respect to each other thereby reducing or preventing microdynamic noise from being generated by the mechanical members 26, 28. The securing means 32 preferably comprises a material having chemical properties which are preselected so that the material maintains a fluid form when applied to the mechanical members 26, 28 and solidifies or cures upon application of a preselected stimulus to create a bond between the mechanical members 26, 28. The preselected stimulus can be man-made or can occur naturally in a space environment. The stimulus can also be generated by a separate device on the spacecraft 10 (FIG. 2). For example, the preselected stimulus can be heat, electricity or UV light. Additionally, the chemical properties of the material used for the securing means 32 (FIGS. 5 & 7) are selected so that the bond between the mechanical members 26, 28 has sufficient holding strength to prevent unintentional movement of the two mechanical members 26, 28 with respect to each other. Preferably, the bond is sufficient to prevent the two mechanical members 26, 28 from moving more than several nanometers with respect to each other. Preferably, the bond allows no more than 1 nanometer of movement between the two mechanical members 26, 28.

Figure 8A:
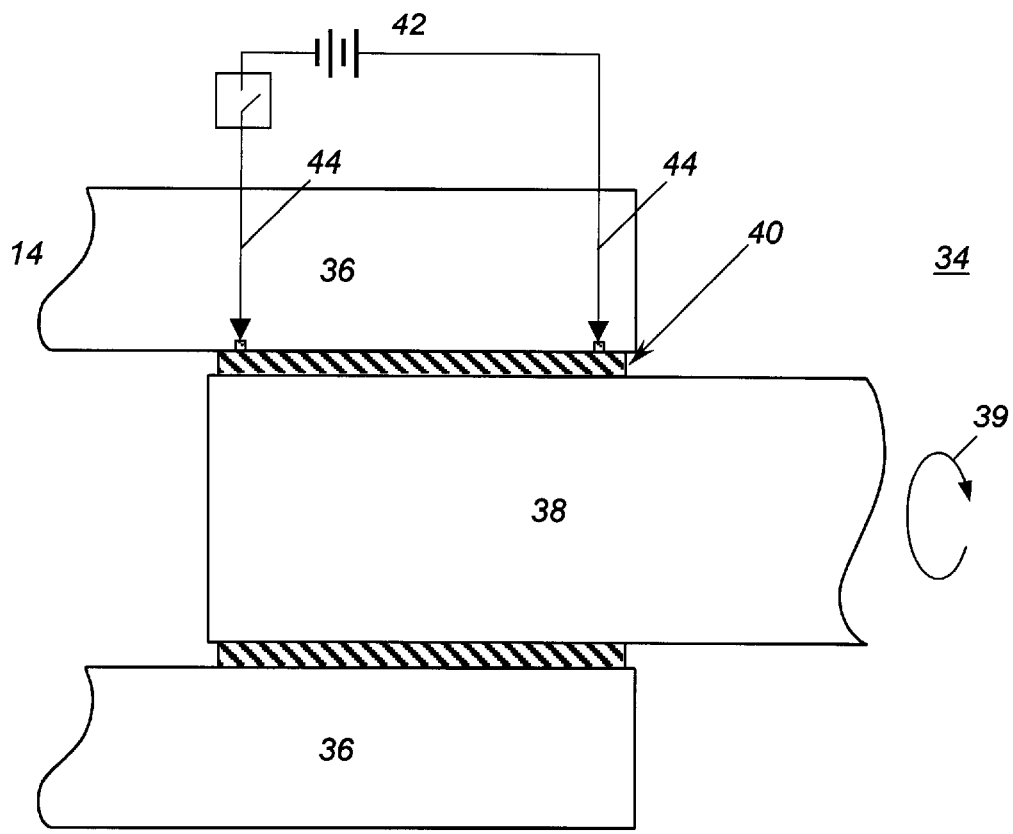
FIG. 8a is a side plan view of a holding mechanism in accordance with a fourth embodiment of the present invention.
Figure 8B:
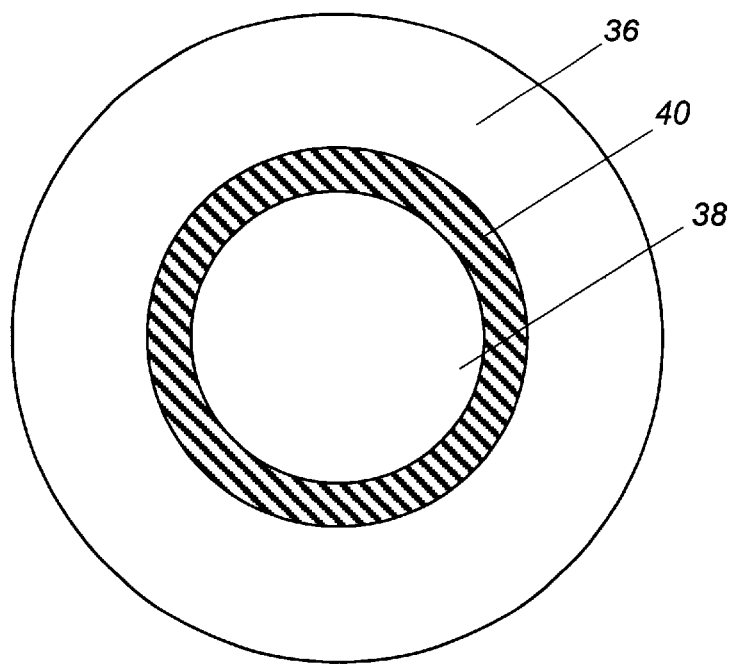

Referring now to FIGS. 8a and 8b, for a fourth embodiment of the invention, the holding mechanism 34 comprises first 36 and second 38 members where the first member 36 is a female receptacle member 36 and the second member 38 is a male rotatable member 38. A movable structure (not shown) is attached to the male rotatable member 38 and is positioned by rotating the second member 38 as indicated by the arrow marked 39. The securing means 40 comprises a preselected amount of a material 40 which is positioned at a preselected location with respect to the members 36, 38. The material 40 is in a solid form until the movable structure is positioned in the preselected location. The material 40 is responsive to a preselected first stimulus 42 and is operative to change states from a solid state to a fluid state upon application of the first stimulus 42 to the material 40. The first stimulus 42 is applied to the material 40 and causes the material 40 to change states. The fluid form of the material 40 flows over the mechanical members 36, 38. The fluid form of the material 40 is responsive to a second stimulus and is operative to change from a fluid state to a solid state upon application of the second stimulus. The second stimulus could be the removal of the first stimulus and exposure to the environment, for example. The fluid form of the material 40 is exposed to the preselected second stimulus and cures to a solid state upon exposure to the preselected second stimulus. For a fourth embodiment of the invention, the material 40 is operative between a solid state and a fluid state upon successive applications of the first 42 and second stimulus, respectively.

For example, the securing means 40 could be comprised of a Eutectic alloy solder 40 which is responsive to the application of electrical heat 42. The solder 40 is operative to change states from a solid state to a fluid state upon application of the heat 42 to the solder 40. The solder 40 is positioned so that in fluid form, the solder 40 flows over both mechanical members 36, 38. The material properties of the solder 40 are preselected so that the fluid form of the solder 40 is responsive to a preselected cold temperature associated with a space environment and operative to solidify and harden upon exposure to the preselected cold temperature. Once the solder has coated preselected portions of both of the members 36, 38, the heat 42 is removed from the solder 40 and the solder 40 is exposed to the cold temperatures associated with space. The solder 40 cools and solidifies back into a solid form to bond together the members 36, 38. The bond prevents unintentional movement of the two members 36, 38 with respect to each other and provides a holding mechanism 48 which is substantially free of microdynamic noise.

The solder is selectively operative between a fluid state and a solid state upon each application and removal of heat 42 and subsequent exposure to cold. This provides for selectively weakening of the bond between the members 36, 38 so that the members 36, 38 can be temporarily unjoined and the movable structure can be moved from the first preselected position to a new preselected position. To do so, the current 44 is continually or selectively applied to the solder 40 to maintain the solder 40 in a fluid form while, at the same time, the movable structure is moved and repositioned to the new preselected location. The current 44 is removed from the solder 40 and the solder 40 is exposed to the cold temperatures associated with space so that the solder 40 cools and resolidifies again thereby bonding the two members 36, 38 together to again provide joinder between the members 36, 38.

Figure 9B:
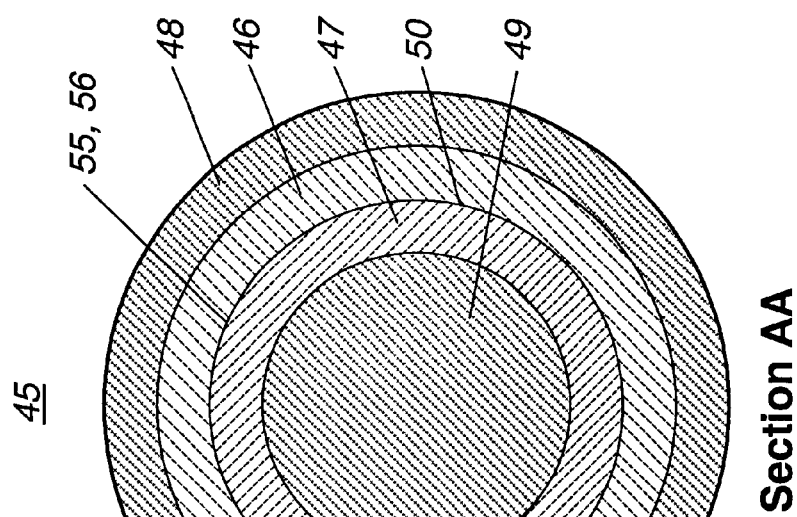
Figure 9A:
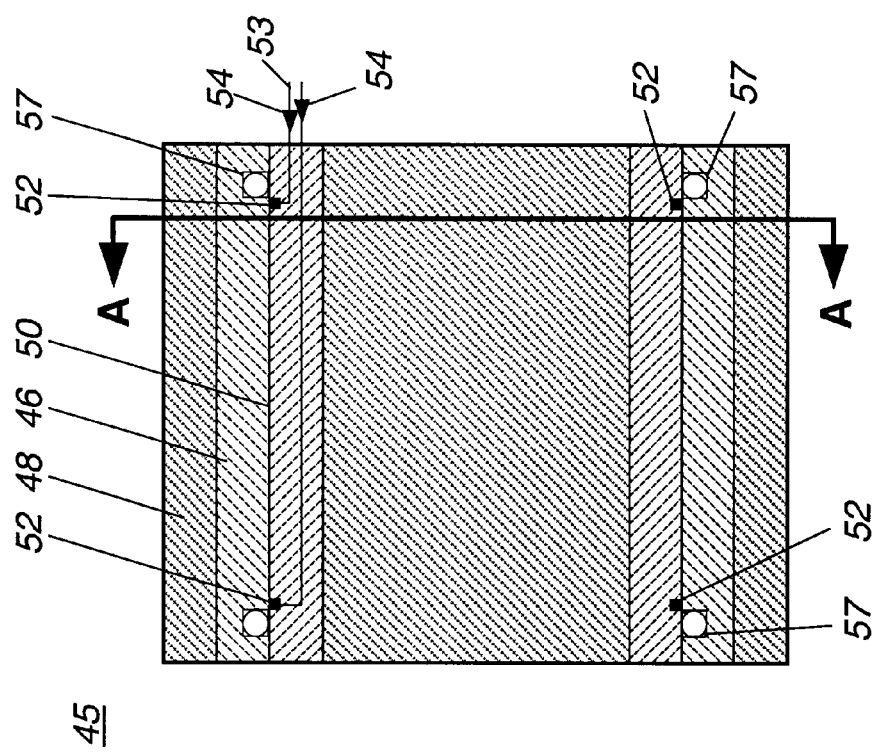
FIG. 9a is a side plane view of a holding mechanism in accordance with a fifth embodiment of the present invention.

Referring to FIGS. 9a and 9b, for a fifth embodiment of the invention, the positioning means is a journal bearing 45 comprising an outer bearing 46 and an inner bearing 47 which are rotatable with respect to each other. Typically, the inner bearing 47 is stationary and the outer bearing 46 rotates and the movable structure (not shown) is coupled to the rotating bearing 46.

The outer 46 and inner 47 bearings are preferably fabricated of an electrical/mechanical insulating material such as a ceramic material and are preferably coupled to outer 48 and inner 49 layers which are each fabricated of metallic materials so that the journal bearing 45 can handle large loads. A thin layer of material 50 is inserted between the inner 47 and outer 46 bearings. The material 50 is operable between a solid state and a fluid state upon application and removal of a stimulus.

The material 50 is preferably an approximately 0.0010 inch thick layer of a eutectic alloy which is operative between a fluid state and a solid state upon application and removal of heat. Application of heat causes the alloy 50 to change states from a solid state to a fluid state. When it is desired to move the bearings 46, 47 and reposition the movable structure, the alloy 50 is heated until the alloy fluidizes and becomes a fluid lubricant for the bearings 46, 47. The fluid form of the alloy 50 provides a semi-hydrodynamic fluid lubricant or boundary lubricant for the bearings 46, 47.

The alloy 50 is maintained in a fluid form during rotation of the bearing 46. After the bearing 46 has been rotated to a new position, the heat is removed from the alloy 50 allowing the fluid form of the alloy 50 to instantly solidify, brazing the surfaces of the inner 47 and outer 46 bearings together. In doing so, the journal bearing 45 is transformed from a two-piece rotating joint to a solid brazed single unit which secures the inner 47 and outer 46 bearings together eliminating any possible unintentional movement of the bearings 46, 47 with respect to each other. The single brazed unit also resists rotational loads to the full shear strength of the brazed alloy.

To provide heat to the alloy 50, the journal bearing 45 is preferably fitted with electrodes 52 near both the ends of the journal bearing 45. Preferably, the electrodes 52 are electrical bus rings 52 which are coupled to lead wires 53. The electrical bus rings 52 are placed in physical contact with the alloy 50. Heat is selectively provided to the bus rings 52 by selective application of current 54 to the lead wires 53. When the current 54 is passed through the alloy 50, the alloy 50 instantly melts and becomes a lubricant between the bearings 46, 47 allowing the rotating bearing 46 to be moved. Alternatively, the entire journal bearing 45 can be heated to melt the alloy 50.

To fabricate the journal bearing 45, the material of the surfaces 55, 56 of the outer 46 and inner 47 bearings respectively which are to be in contact with the alloy 50 are selected to provide a wetted surface to the fluid form of the alloy 50. The wetted surfaces 55, 56 act to tenaciously hold the fluid form of the alloy 50 between the bearing surfaces 55, 56 and provide maximum shear strength when the alloy 50 is in a solid state. If required, seals 57 will be added near the ends of the outer 46 and inner 47 bearings to contain the fluid form of the alloy 50 between the bearings 46, 47.

To assemble the journal bearing 45, a surface 55, 56 of each bearings 46, 47 is treated to allow wetting of the surfaces 55, 56 with the eutectic alloy. Each surface 55, 56 is wetted with this alloy and then machined back to a layer of between 0.0005 to 0.001 inches to allow the outer 46 and inner 47 bearings to fit together. The bearings 46, 47 slide together when heated above the melting point of the alloy.

Figure 10:
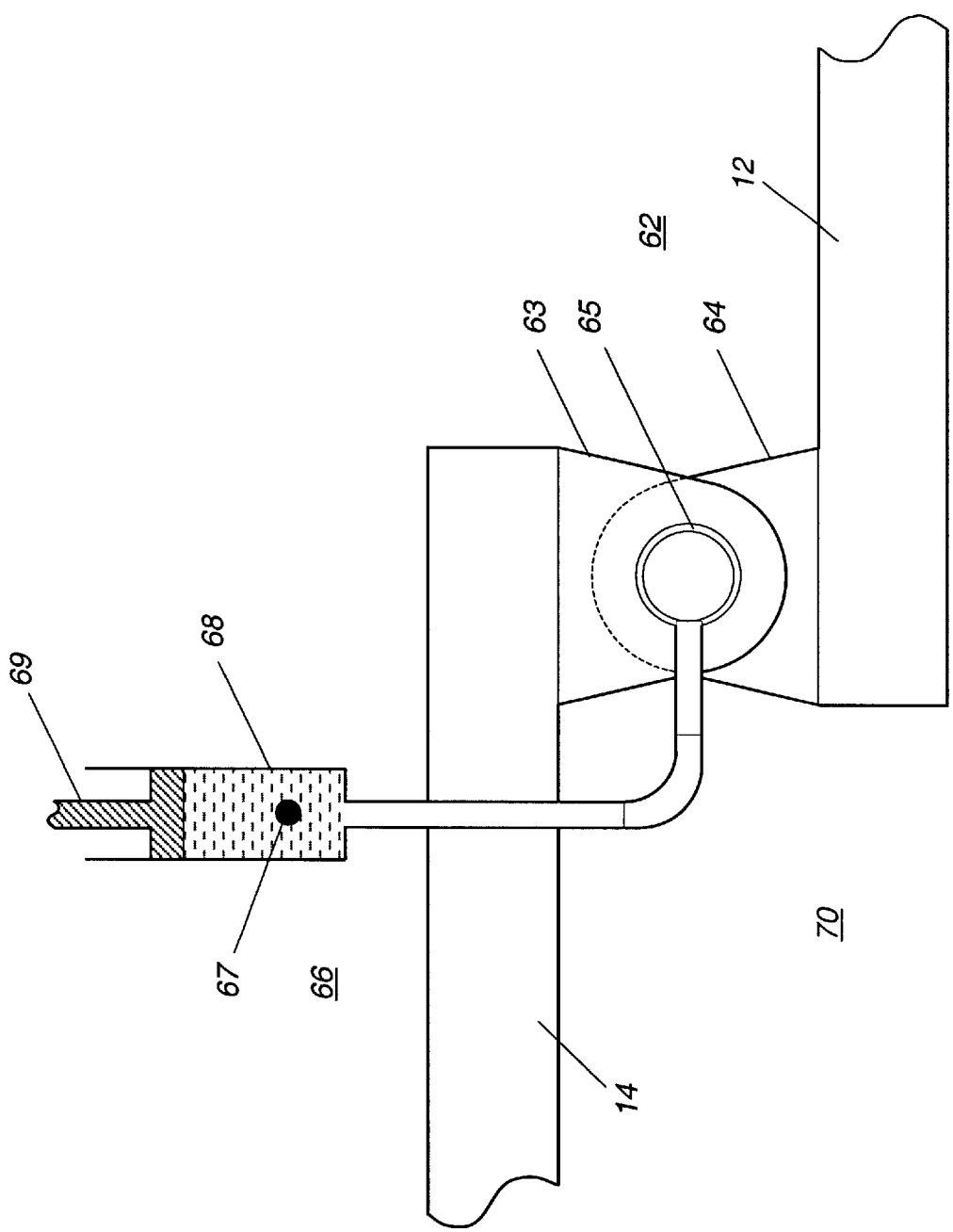
FIG. 10 is a side plane view of a holding mechanism and depicts a method to secure the holding mechanism in accordance with a sixth embodiment of the present invention; and, FIGS. 11a–11b show a side plane view of a holding mechanism and depicts a method to secure the holding mechanism in accordance with a seventh embodiment of the present invention seventh embodiments of the invention.

Referring now to FIG. 10, for a sixth embodiment of the invention, the securing means 66 comprises a preselected amount of a holding adhesive 67 which is held in a fluid state inside a container 68. The container 68 is positioned in a preselected location with respect to the holding mechanism 62. The holding mechanism 62 comprises first 63 and second 64 mechanical members coupled together with a hinge 65. The holding adhesive 67 is in a fluid state when inside of the container 68. The container 68 is responsive to the application of a stimulus 69 and is operative to dispense the holding adhesive 67 upon application of the stimulus 69. The container 68 is positioned so that the holding adhesive 67 is dispensed in a preselected manner so as to coat the mechanical members 63, 64 and the hinge 65 of the holding mechanism 62 with the holding adhesive 67. The holding adhesive 67 is operative to cure and harden upon exposure to a preselected stimulus such as exposure to the heat associated with space thereby producing a bond between the two mechanical members 63, 64 and providing joinder between the mechanical members 63, 64.

For example, container 68 can hold adhesive 67 which will change from a fluid state to a solid state after drying, such as from exposure to vacuum 70. Using a stimulus in the form of a pump 69, the adhesive 67 can be injected into the holding mechanism 62, whereupon the adhesive 67 will dry upon exposure to the vacuum 70. The dry adhesive 67 will bond the mechanical members 63, 64.

It will be appreciated by one skilled in the art that the present invention is not limited to an adhesive material which is subject to drying but may be practiced with any holding adhesive which is responsive to a preselected stimulus. Preferably, the preselected stimulus is a stimulus which is readily available and present in a space environment such as heat, extreme cold, thermal cycling, UV radiation, or the like so that a separate mechanism is not required to provide the preselected stimulus. Alternatively, a separate mechanism (not shown) can be provided to provide the preselected stimulus.

Figure 11A:
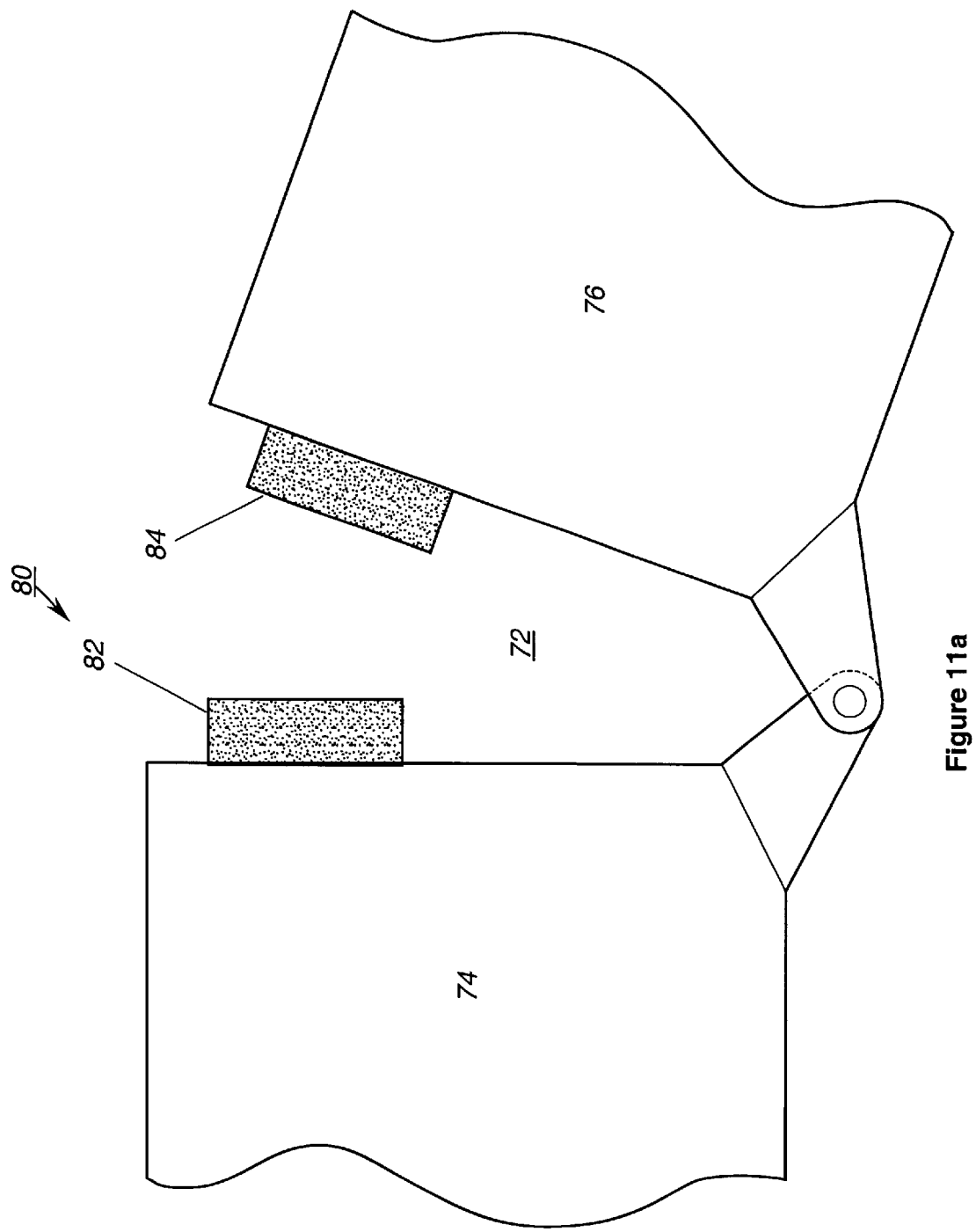
Figure 11B:
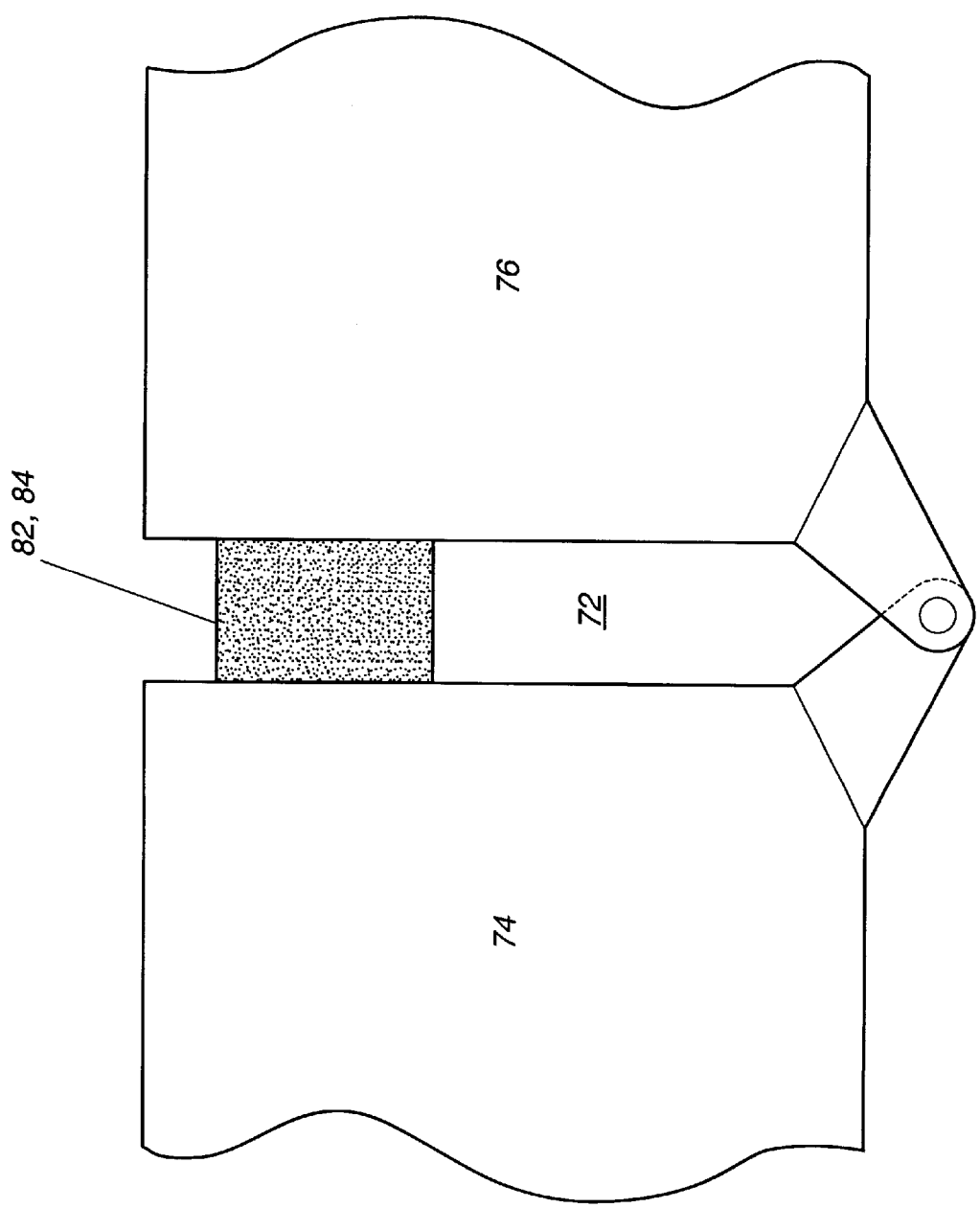

Referring to FIGS. 11a and 11b, for a seventh embodiment of the invention, the holding mechanism 72 comprises first 74 and second 76 mechanical members, the securing means 80 comprises a first 82 and a second 84 material which are each applied to a different preselected location on each of the two mechanical members 74, 76. The first 82 and second 84 materials are selected to be chemically reactive with each other and bond together when placed in physical contact with each other. As shown in FIG. 11a, the preselected locations are chosen so that the first 82 and second 84 materials are initially distal from each other and, as shown in FIG. 11b, become in physical contact with each other when the movable structure (not shown) is positioned in the preselected location. Upon being placed in physical contact with each other, the first 82 and second 84 materials bond together thereby securing together the first 74 and the second 76 mechanical members. The first 82 and second 84 materials are preselected so that the bond provided between the first 82 and second 84 materials is sufficient to join the two mechanical members 74, 76 together to provide a secure bond between the two mechanical members 74, 76 and prevent unintentional long-term movement between the two mechanical members 74, 76.

As an example, the mechanical members 74, 76 could comprise first 74 and a second 76 hinged member. The first material 82 could comprise a catalyst material 82 which is positioned at a preselected location on the first hinged member 74. The second material 84 could comprise a resin material 84 which is positioned at a preselected location on the second hinged member 76 such that the first 82 and second 84 materials are not in physical contact with each other until the movable structure is positioned in the preselected location. The movable structure is moved to the preselected position whereupon the catalyst 82 and resin 84 materials make physical contact with each other creating a chemical reaction which joins the catalyst 82 and resin 84 materials together and provides a secure bond between the first 74 and second 76 hinged members. The secure bond prevents unintentional long-term movement between the two hinged members 74, 76 reducing or eliminating the potential for the two hinged members 74, 76 to move with respect to each other and create microdynamic noise.

It will be appreciated by one skilled in the art that the present invention is not limited to a securing means comprising a catalyst and a resin material. The present invention can be practiced with any two materials which are chemically responsive to each other and bond together upon being placed in physical contact with each other.

The present invention provides a spacecraft having a movable structure which is held in a preselected location by a holding mechanism substantially free of microdynamic noise and provides a method for reducing or eliminating microdynamic noise which is associated with a holding mechanism on a spacecraft. It will be appreciated by one skilled in the are that the present invention is not limited to what has been shown and described herein above. The scope of the invention is limited solely by the claims which follow.

What is claimed is:

1. A spacecraft comprising:

a spacecraft body;

a movable structure coupled to the spacecraft body;

positioning means for positioning the movable structure to a preselected location with respect to the spacecraft body, the positioning means being a rotatable mechanical joint which is operative to move the moveable structure to the preselected location;

a holding mechanism for holding the movable structure in the preselected location, the holding mechanism including two mechanical members which are in physical contact and are movable with respect to each other; and, securing means for providing joinder of the two mechanical members upon the movable structure being located to the preselected position to prevent long-term unintentional movement between the two mechanical members, the securing means provides an approximately rigid interface between the two mechanical members and provides sufficient holding strength to hold the movable structure in the preselected location.

2. A spacecraft comprising:

a spacecraft body;

a movable structure coupled to the spacecraft body;

positioning means for positioning the movable structure to a preselected location with respect to the spacecraft body, the positioning means being a rotatable mechanical joint which is operative to move the moveable structure to the preselected location;

a holding mechanism for holding the movable structure in the preselected location, the holding mechanism including two mechanical members which are in physical contact and are movable with respect to each other; and, securing means for providing joinder of the two mechanical members upon the movable structure being located to the preselected position to prevent long-term unintentional movement between the two mechanical members, the securing means provides an approximately rigid interface between the two mechanical members and provides sufficient holding strength to hold the movable structure in the preselected location, wherein the approximately rigid interface prevents the two mechanical members from moving more than 1 nanometer with respect to each other.

3. A spacecraft comprising:

a spacecraft body;

a movable structure coupled to the spacecraft body;

positioning means for positioning the movable structure to a preselected location with respect to the spacecraft body;

a holding mechanism for holding the movable structure in the preselected location, the holding mechanism including two mechanical members which are in physical contact and are movable with respect to each other; and, securing means for providing joinder of the two mechanical members upon the movable structure being located to the preselected position to prevent long-term unintentional movement between the two mechanical members, wherein the securing means comprises a securing material which is in a solid form until the movable structure is approximately located in the preselected location, the securing material being responsive to a stimulus and operative to change states to a fluid form upon application of the stimulus, the securing material being positioned so that the fluid form of the securing material flows over the two mechanical members, the securing material solidifying upon removal of the stimulus so that the securing material provides joinder of the two mechanical members.

4. The spacecraft as in claim 3, wherein the securing material is operative between a fluid state and a solid state upon successive applications and removals of the stimulus respectively providing joinder between the two mechanical members when the material is solidified over the two mechanical members.

5. The spacecraft as in claim 4, wherein the securing material is a temperature dependent phase change material and the stimulus is heat.

6. The spacecraft as in claim 5, wherein the securing material is a solder material and the stimulus is an electrical current application of which generates heat in the solder material and fluidizes the solder material, the solder material solidifying after removal of the current.

7. A spacecraft comprising:

a spacecraft body;

a movable structure coupled to the spacecraft body;

positioning means for positioning the movable structure to a preselected location with respect to the spacecraft body;

a holding mechanism for holding the movable structure in the preselected location, the holding mechanism including two mechanical members which are in physical contact and are movable with respect to each other; and, securing means for providing joinder of the two mechanical members upon the movable structure being located to the preselected position to prevent long-term unintentional movement between the two mechanical members, wherein the securing means is a material which is in a fluid form when applied to the mechanical members and cures to form a rigid interface between the mechanical members upon exposure to a preselected condition.

8. The spacecraft as in claim 7, wherein the securing means is epoxy.

9. The spacecraft as in claim 7, wherein the preselected condition is electricity.

10. The spacecraft as in claim 7, wherein the preselected condition is a preselected environmentally generated condition.

11. The spacecraft as in claim 10, wherein the preselected environmental condition is a preselected amount of UV light.

12. The spacecraft as in claim 10, wherein the preselected environmentally generated condition is a preselected amount of heat.

13. A spacecraft comprising;

a spacecraft body;

a movable structure coupled to the spacecraft body;

positioning means for positioning the movable structure to a preselected location with respect to the spacecraft body;

a holding mechanism for holding the movable structure in the preselected location, the holding mechanism including two mechanical members which are in physical contact and are movable with respect to each other; and, securing means for providing joinder of the two mechanical members upon the movable structure being located to the preselected position to prevent long-term unintentional movement between the two mechanical members, wherein the securing means comprises a first and a second material, one of which being applied to each mechanical member, the chemical properties of each material preselected to be chemically reactive with one another and secure together upon being placed in physical contact with one another, the materials being positioned on the members in preselected locations so that the materials are only in physical contact with each other when the movable structure is located in the preselected position, the securing together of the materials providing joinder of the two mechanical members.

14. The spacecraft of claim 13, the two materials comprise a catalyst material and a resin material.

15. A spacecraft comprising:

a spacecraft body;

a movable structure coupled to the spacecraft body;

positioning means for positioning the movable structure to a preselected location with respect to the spacecraft body;

a holding mechanism for holding the movable structure in the preselected location, the holding mechanism including two mechanical members which are in physical contact with each other and are movable with respect to each other; and, a preselected amount of material coupled to the holding mechanism which is in a substantially solid form until the movable structure is approximately located to the preselected location, the preselected amount of material being responsive to a preselected stimulus and operative to change form from the substantially solid form to a substantially fluid form upon application of the stimulus, the preselected amount of material being positioned so that the fluid form of the material flows about the holding mechanism and resolidifies about the two mechanical members after the stimulus has been removed for a preselected amount of time thereby providing joinder of the two mechanical members to prevent long-term unintentional movement between the two mechanical members.

16. The spacecraft of claim 15, wherein the preselected amount of material is a preselected amount of a solder material and the preselected stimulus is preselected amount of heat.

17. The spacecraft of claim 16, wherein the solder material is operative between the solid state and the fluid state upon successive removal and application of the heat respectively, the movable structure being movable to any preselected location when the solder material is in the fluid state and substantially unmovable when the solder material is in the solid state.

18. A spacecraft comprising:

a spacecraft body;

a movable structure coupled to the spacecraft body;

positioning means for positioning the movable structure to a preselected location with respect to the spacecraft body;

a holding mechanism for holding the movable structure in the preselected location, the holding mechanism including two mechanical members which are in physical contact with each other and are movable with respect to each other; and, a container coupled to the holding mechanism, the container holding a holding adhesive, the container configured to be responsive to a first preselected stimulus and operative to dispense the holding adhesive over the two mechanical members upon application of the first stimulus, the holding adhesive being responsive to a second preselected stimulus and operative to harden over the two mechanical members after exposure to the second stimulus, the hardening of the holding adhesive providing joinder of the two mechanical members to prevent long-term unintentional movement between the two mechanical members.

19. The spacecraft of claim 18, wherein the second stimulus is a preselected amount of UV light.

20. The spacecraft of claim 18, wherein the second stimulus is a preselected amount of heat.

21. The spacecraft of claim 18, wherein the second stimulus is electricity.

22. The spacecraft of claim 18, wherein the second stimulus is an environmentally generated stimulus.

23. The spacecraft of claim 18, wherein the holding adhesive comprises an epoxy.

24. A method of decreasing microdynamic noise on a spacecraft which has a movable structure coupled to the spacecraft comprising the steps of:

moving the movable structure to a preselected location;

holding the movable structure in the preselected location with a holding mechanism comprised of two mechanical members which are physically in contact with each other and are movable with respect to each other, movement of the two mechanical members with respect to each other generating microdynamic noise; and securing the two mechanical members together by:
flowing an adhesive material over both mechanical members; and,
curing the adhesive material so that the adhesive material solidifies and secures the two mechanical members to prevent unintentional movement of the two mechanical members with respect to each other together in a microdynamic range of less than 1 nanometer of motion.

25. The method of claim 24, further comprises the steps of:

selecting an adhesive material which is responsive to UV light and operative to cure to a rigid state upon exposure to a preselected amount of UV light; and, exposing the adhesive material to a preselected amount of UV light thereby curing the adhesive material and providing a rigid bond between the two mechanical members.

26. A method of decreasing microdynamic noise on a spacecraft which has a movable structure coupled to the spacecraft comprising the steps of:

moving the movable structure to a preselected location;

holding the movable structure in the preselected location with a holding mechanism comprised of two mechanical members which are physically in contact with each other and are movable with respect to each other, movement of the two mechanical members with respect to each other generating microdynamic noise; and, securing the two mechanical members together to prevent unintentional long-term movement of the two mechanical members with respect to each other comprising the steps of:
providing a solder material which is coupled to the holding mechanism and is responsive to the application of heat, the solder material being operative between a fluid state and a solid state upon application and removal of heat respectively;
positioning the solder material so that upon application of heat to the solder the solder flows in the fluid state over the two mechanical members of the holding mechanism;
applying heat to the solder material to fluidize the solder material and cause the solder material to flow over the two mechanical members of the holding mechanism; and,
removing the application of heat from the solder material to allow the solder material to solidify thereby securing together the two mechanical members of the holding mechanism.

27. A method of decreasing microdynamic noise on a spacecraft which has a movable structure coupled to the spacecraft comprising the steps of:

moving the movable structure to a preselected location;

holding the movable structure in the preselected location with a holding mechanism comprised of two mechanical members which are physically in contact with each other and are movable with respect to each other, movement of the two mechanical members with respect to each other generating microdynamic noise; and, securing the two mechanical members together to prevent unintentional long-term movement of the two mechanical members with respect to each other by:
applying a catalyst material to one of the mechanical members and a resin material to the other mechanical member, the catalyst material and the resin material being preselected to have chemical properties which chemically react and bond together with each other upon physical contact with each other, the catalyst material and the resin material being positioned at preselected locations so that the materials are in physical contact only after the movable structure is positioned in the preselected location whereupon the catalyst material and the resin materials chemically react and bond together to join the two mechanical members and prevent unintentional long-term movement between the two mechanical members.

* * * * *